United States Patent
Gao et al.

(10) Patent No.: US 10,401,863 B2
(45) Date of Patent: Sep. 3, 2019

(54) ROAD CORRIDOR

(71) Applicant: GM GLOBAL TECHNOLOGY OPERATIONS LLC, Detroit, MI (US)

(72) Inventors: Yiqi Gao, Mountain View, CA (US); Sohrab Haghighat, Emeryville, CA (US); Brooks Reed, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 15/820,543

(22) Filed: Nov. 22, 2017

(65) Prior Publication Data

US 2018/0074507 A1    Mar. 15, 2018

(51) Int. Cl.
*G05D 1/02* (2006.01)
*B60W 30/09* (2012.01)
*G05D 1/00* (2006.01)

(52) U.S. Cl.
CPC .......... *G05D 1/0214* (2013.01); *B60W 30/09* (2013.01); *G05D 1/0088* (2013.01); *G05D 1/0289* (2013.01); *B60W 2550/10* (2013.01); *G05D 2201/0213* (2013.01)

(58) Field of Classification Search
CPC .. G05D 1/0214; G05D 1/0289; G05D 1/0088; G05D 2201/0213; B60W 30/09; B60W 2550/10
See application file for complete search history.

(56) References Cited

U.S. PATENT DOCUMENTS

2016/0368505 A1* 12/2016 Sorstedt ................ B60W 30/12
2018/0203453 A1*  7/2018 Hardy .................. G05D 1/0214

* cited by examiner

*Primary Examiner* — Rodney A Butler
(74) *Attorney, Agent, or Firm* — Lorenz & Kopf, LLP

(57) ABSTRACT

A method includes identifying a current position of the vehicle, using sensor data; generating, via a processor, an initial corridor seeding based upon the current position of the vehicle and physical characteristics of the road, without consideration of any other objects on the roadway; identifying a plurality of objects along a first side of the roadway, the first side including a side of the roadway in which the vehicle is traveling, using the sensor data; generating, via the processor, a target first boundary for the corridor based on the identified plurality of objects along the first side of the roadway; generating, via the processor, a target second boundary on a second side of the roadway, opposite the first side; and adjusting, via the processor, the initial corridor seeding based on the target first and second boundaries, thereby generating the corridor of travel for the vehicle along the roadway.

20 Claims, 10 Drawing Sheets

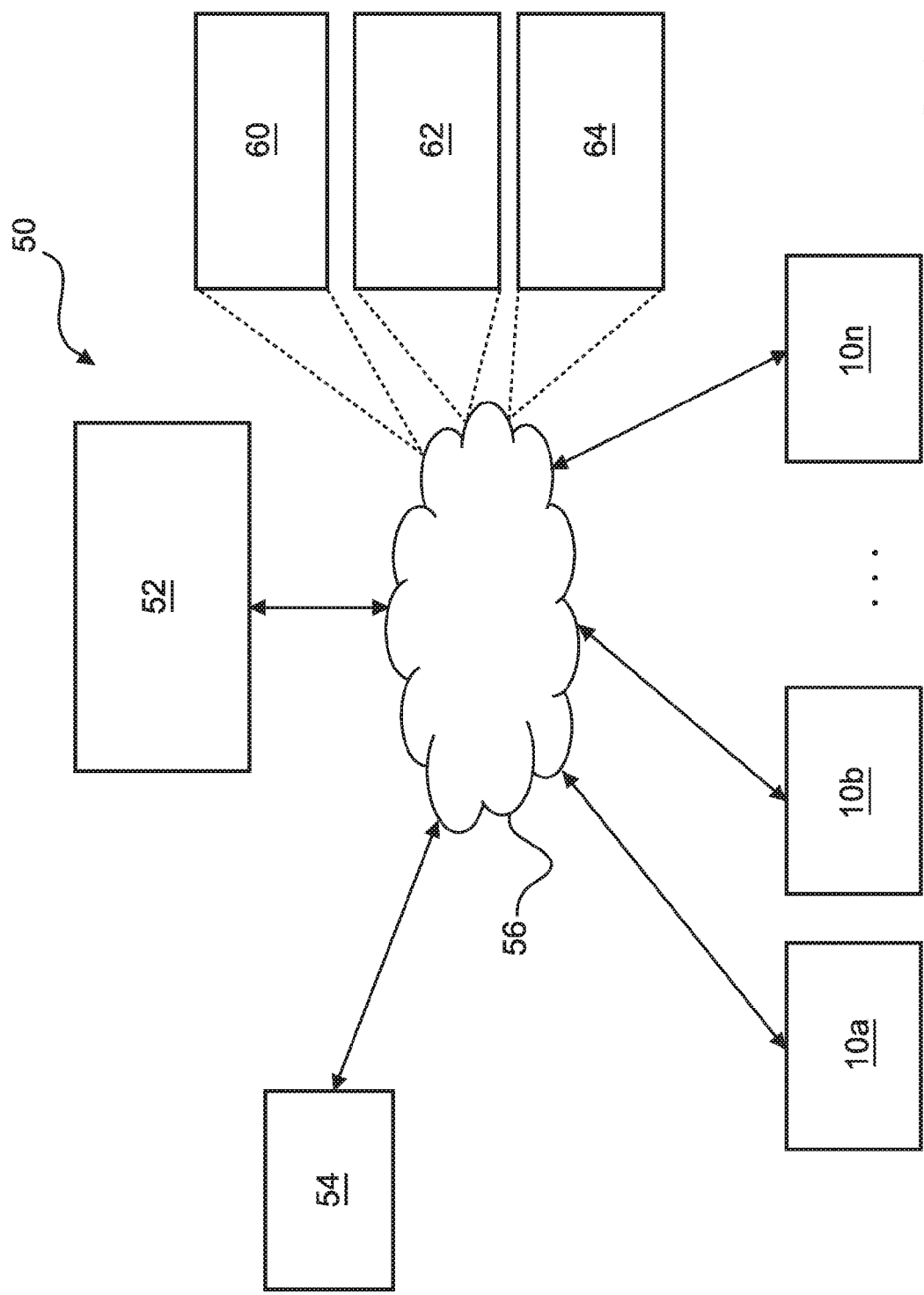

ROAD CORRIDOR

TECHNICAL FIELD

The present disclosure generally relates to vehicles, and more particularly relates to systems and methods for planning a corridor for a vehicle's movement through a roadway in which other vehicles and obstacles may encroach on the vehicle's intended path.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved movement of autonomous vehicles, for example on roadways shared with other vehicles that do not have lane markers.

Accordingly, it is desirable to provide systems and methods for operation of vehicles, such as autonomous vehicles, including planning a corridor for a vehicle's movement through a roadway that is shared with other vehicles. Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for generating corridors for travel for vehicles. In one example, a method for generating a corridor of travel for a vehicle along a roadway includes: identifying a current position of the vehicle, using sensor data; generating, via a processor, an initial corridor seeding based upon the current position of the vehicle and physical characteristics of the road, without consideration of any other objects on the roadway; identifying a plurality of objects along a first side of the roadway, the first side including a side of the roadway in which the vehicle is traveling, using the sensor data; generating, via the processor, a target first boundary for the corridor based on the identified plurality of objects along the first side of the roadway; generating, via the processor, a target second boundary on a second side of the roadway, opposite the first side; and adjusting, via the processor, the initial corridor seeding based on the target first boundary and the target second boundary, thereby generating the corridor of travel for the vehicle along the roadway.

Also in one example, the step of generating the target first boundary includes selecting one of a plurality of possible target first boundaries that minimizes a difference between a curvature of the corridor and a curvature of the roadway while maintaining a first initial buffer between the vehicle and the objects on the first side of the roadway.

Also in one example, the step of generating the target second boundary includes selecting one of a plurality of possible target second boundaries based on consideration of detected objects on the second side of the roadway, that minimizes the difference between the curvature of the corridor and the curvature of the roadway while maintaining a second initial buffer between the vehicle and the detected objects on the second side of the roadway.

Also in one example, the step of identifying the plurality of objects includes identifying a plurality of parked vehicles along the first side of the roadway, using the sensor data; the step of generating the target first boundary includes generating the target first boundary for the corridor based on the parked vehicles along the first side of the roadway, including a first initial buffer between the vehicle and the parked vehicles, while minimizing a difference between a curvature of the corridor and a curvature of the roadway; the step of generating the target second boundary on the second side of the roadway includes: identifying one or more oncoming vehicles moving along the second side of the roadway, using the sensor data; and generating the target second boundary based on the one or more oncoming vehicles, including a second initial buffer between the vehicle and the one or more oncoming vehicles, while minimizing the difference between the curvature of the corridor and the curvature of the roadway.

Also in one example, the method further includes performing a check as to whether the vehicle is expected to contact one of the parked vehicles, oncoming vehicles, or both; and adjusting a width of the corridor as necessary to avoid the contact.

Also in one example, the method further includes performing a check as to whether the corridor satisfies a curvature feasibility constraint, a steering acceleration constraint, or both; and adjusting the corridor if the corridor does not satisfy the curvature feasibility constraint, the steering acceleration constraint, or both.

Also in one example, wherein the vehicle includes an autonomous vehicle, and the method further includes automatically operating the autonomous vehicle along the corridor, via instructions provided by the processor.

In another example, a system for generating a corridor of travel for a vehicle along a roadway includes a detection module and a processing module. The detection module is configured to at least facilitate: identifying a current position of the vehicle, using sensor data; and identifying a plurality of objects along a first side of the roadway, the first side including a side of the roadway in which the vehicle is traveling, using the sensor data. The processing module coupled to the detection module and configured to at least facilitate: generating, via a processor, an initial corridor seeding based upon the current position of the vehicle and physical characteristics of the road, without consideration of any other objects on the roadway; generating, via the processor, a target first boundary for the corridor based on the identified plurality of objects along the first side of the roadway; generating, via the processor, a target second boundary on a second side of the roadway, opposite the first side; and adjusting, via the processor, the initial corridor seeding based on the target first boundary and the target second boundary, thereby generating the corridor of travel for the vehicle along the roadway.

Also in one example, the processing module is configured to at least facilitate selecting one of a plurality of possible target first boundaries that minimizes a difference between a curvature of the corridor and a curvature of the roadway while maintaining a first initial buffer between the vehicle and the objects on the first side of the roadway.

Also in one example, the processing module is configured to at least facilitate selecting one of a plurality of possible target second boundaries based on consideration of detected objects on the second side of the roadway, that minimizes the difference between the curvature of the corridor and the curvature of the roadway while maintaining a second initial buffer between the vehicle and the detected objects on the second side of the roadway.

Also in one example, the detection module is configured to at least facilitate: identifying a plurality of parked vehicles along the first side of the roadway, using the sensor data; and identifying one or more oncoming vehicles moving along the second side of the roadway, using the sensor data; and the processing module is configured to at least facilitate: generating the target first boundary for the corridor based on the parked vehicles along the first side of the roadway, including a first initial buffer between the vehicle and the parked vehicles, while minimizing a difference between a curvature of the corridor and a curvature of the roadway; and generating the target second boundary based on the one or more oncoming vehicles, including a second initial buffer between the vehicle and the one or more oncoming vehicles, while minimizing the difference between the curvature of the corridor and the curvature of the roadway.

Also in one example, wherein the processing module is configured to at least facilitate: performing a check as to whether the vehicle is expected to contact one of the parked vehicles, oncoming vehicles, or both; and adjusting a width of the corridor as necessary to avoid the contact.

Also in one example, the processing module is configured to at least facilitate: performing a check as to whether the corridor satisfies a curvature feasibility constraint, a steering acceleration constraint, or both; and adjusting the corridor if the corridor does not satisfy the curvature feasibility constraint, the steering acceleration constraint, or both.

Also in one example, the vehicle includes an autonomous vehicle, and the processing module is configured to at least facilitate automatically operating the autonomous vehicle along the corridor, via instructions provided by the processor.

In another example, an autonomous vehicle includes an automotive drive system, a plurality of sensors, and a processor. The autonomous drive system is configured to operate the autonomous vehicle based on instructions that are based at least in part on a roadway in which the autonomous vehicle is traveling. The plurality of sensors are configured to obtain sensor data identifying a current position of the vehicle and a plurality of objects along a first side of the roadway, the first side including a side of the roadway in which the vehicle is traveling. The processor is coupled to the plurality of sensors and to the autonomous drive system, the processor configured to at least facilitate: generating an initial corridor seeding based upon the current position of the vehicle and physical characteristics of the road, without consideration of any other objects on the roadway; generating a target first boundary for the corridor based on the plurality of identified objects along the first side of the roadway; generating a target second boundary on a second side of the roadway, opposite the first side; adjusting the initial corridor seeding based on the target first boundary and the target second boundary, thereby generating a corridor of travel for the vehicle along the roadway; and providing the instructions to the autonomous drive system to operate the autonomous vehicle along the corridor.

Also in one example, the processor is configured to at least facilitate selecting one of a plurality of possible target first boundaries that minimizes a difference between a curvature of the corridor and a curvature of the roadway while maintaining a first initial buffer between the vehicle and the objects on the first side of the roadway.

Also in one example, the processor is configured to at least facilitate selecting one of a plurality of possible target second boundaries based on consideration of detected objects on the second side of the roadway, that minimizes the difference between the curvature of the corridor and the curvature of the roadway while maintaining a second initial buffer between the vehicle and the detected objects on the second side of the roadway.

Also in one example, the plurality of sensors are configured to at least facilitate: identifying a plurality of parked vehicles along the first side of the roadway, using the sensor data; and identifying one or more oncoming vehicles moving along the second side of the roadway, using the sensor data; and the processor is configured to at least facilitate: generating the target first boundary for the corridor based on the parked vehicles along the first side of the roadway, including a first initial buffer between the autonomous vehicle and the parked vehicles, while minimizing a difference between a curvature of the corridor and a curvature of the roadway; and generating the target second boundary based on the one or more oncoming vehicles, including a second initial buffer between the autonomous vehicle and the one or more oncoming vehicles, while minimizing the difference between the curvature of the corridor and the curvature of the roadway.

Also in one example, the processor is configured to at least facilitate: performing a check as to whether the autonomous vehicle is expected to contact one of the parked vehicles, oncoming vehicles, or both; and adjusting a width of the corridor as necessary to avoid the contact.

Also in one example, the processor is configured to at least facilitate: performing a check as to whether the corridor satisfies a curvature feasibility constraint, a steering acceleration constraint, or both; and adjusting the corridor if the corridor does not satisfy the curvature feasibility constraint, the steering acceleration constraint, or both.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
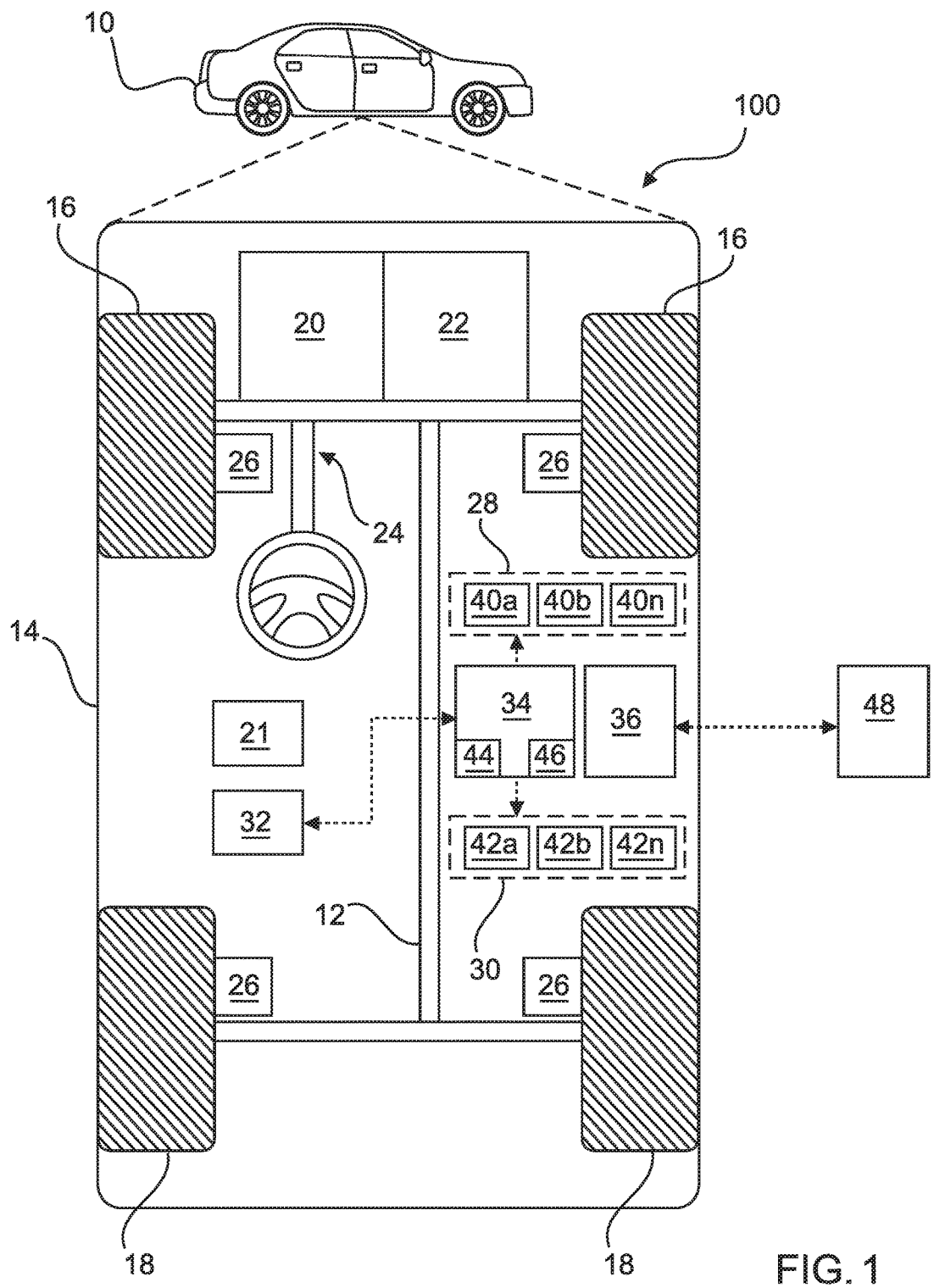
FIG. 1 is a functional block diagram illustrating a vehicle having a corridor planning system, in accordance with various embodiments.

With reference to FIG. 1, a corridor planning system shown generally as 100 is associated with a vehicle 10 (also referred to herein as a "host vehicle") in accordance with various embodiments. In general, the corridor planning system (or simply "system") 100 provides planning for a corridor of travel for the vehicle 10 through a roadway that is shared with other vehicles (e.g., which may be referred to as "other vehicles" or "target vehicles" herein). For example, in various embodiments, the vehicle 10 plans its corridor for travel based on any parked vehicles along the roadway and any possible oncoming vehicles of the roadway, in accordance with the process 500 discussed further below in connection with FIGS. 5-9. In various embodiments, the "corridor" for the vehicle 10 comprises the left and right boundaries generated for the vehicle 10 (or host vehicle) to follow and drive within. Also in various embodiments, the corridor is generated considering the road geometry, parked vehicles, oncoming vehicles, basic vehicle dynamics, and so on.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 comprise a wheel assembly that also includes respective associated tires.

In various embodiments, the vehicle 10 is an autonomous vehicle, and the corridor planning system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous, non-autonomous, or other vehicle that includes sensors and a suspension system.

As shown, the vehicle 10 generally includes a propulsion system 20, a transmission system 22, a steering system 24, a brake system 26, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

In various embodiments, one or more user input devices 27 receive inputs from one or more passengers of the vehicle 10. In various embodiments, the inputs include a desired destination of travel for the vehicle 10. In certain embodiments, one or more input devices 27 comprise an interactive touch-screen in the vehicle 10. In certain embodiments, one or more inputs devices 27 comprise a speaker for receiving audio information from the passengers. In certain other embodiments, one or more input devices 27 may comprise one or more other types of devices and/or may be coupled to a user device (e.g., smart phone and/or other electronic device) of the passengers, such as the user device 54 depicted in FIG. 2 and described further below in connection therewith).

The sensor system 28 includes one or more sensors 40*a*-40*n* that sense observable conditions of the exterior environment and/or the interior environment of the vehicle 10. The sensors 40*a*-40*n* include, but are not limited to, radars, lidars, global positioning systems, optical cameras, thermal cameras, ultrasonic sensors, inertial measurement units, and/or other sensors.

The actuator system 30 includes one or more actuators 42*a*-42*n* that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figures 1, 7:
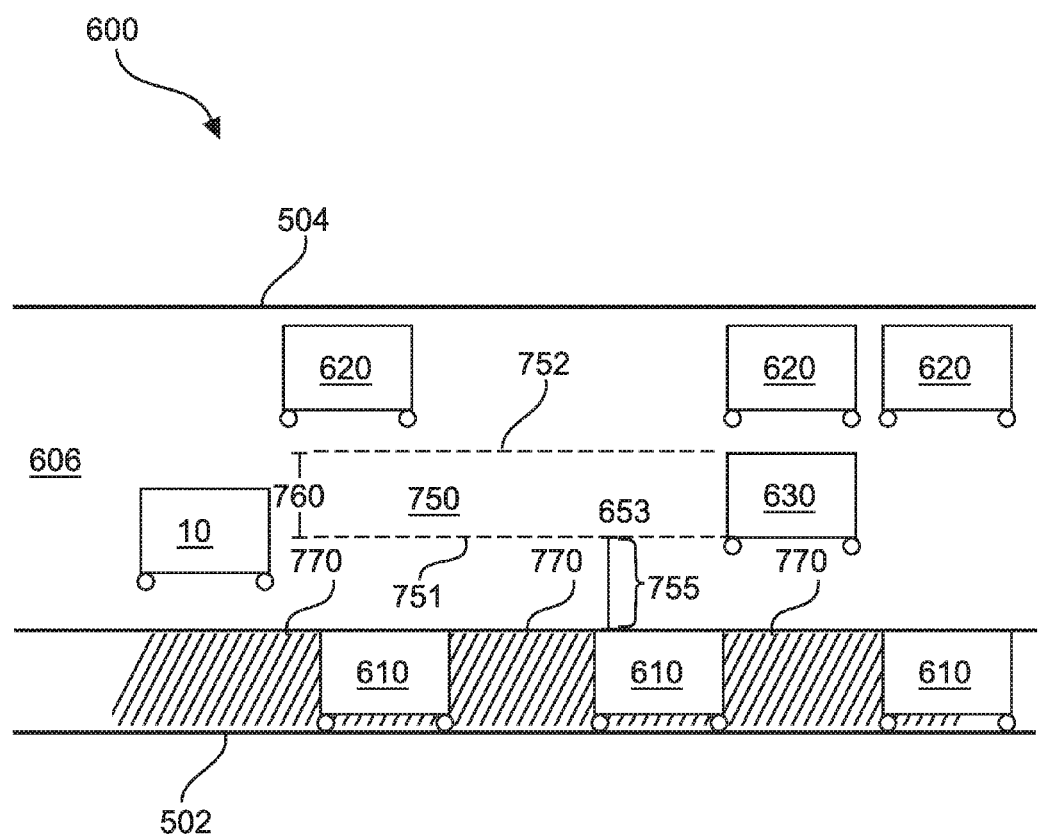
Figures 2, 7:
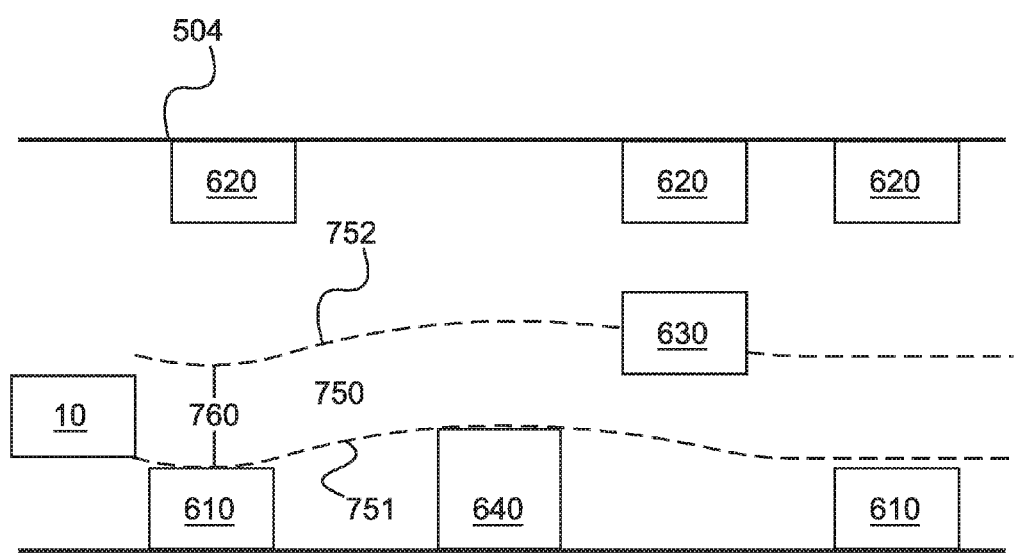
FIG. 2 is a functional block diagram illustrating a transportation system having one or more vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In certain embodiments, the communication system 36 is further configured for communication between the sensor system 28, the input device 27, the actuator system 30, one or more controllers (e.g., the controller 34), and/or more other systems and/or devices (such as, by way of example, the user device 54 depicted in FIG. 2 and described further below in connection therewith). For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, in various embodiments, the vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more vehicles 10*a*-10*n* as described with regard to FIG. 1. In various embodiments, the operating environment 50 (all or a part of which may correspond to entities 48 shown in FIG. 1) further includes one or more user devices 54 that communicate with the vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the vehicles 10a-10n to schedule rides, dispatch vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline vehicle 10 and/or a vehicle based remote transportation system 52. To this end, a vehicle and vehicle based remote transportation system can be modified, enhanced, or otherwise supplemented to provide the additional features described in more detail below.

Figure 3:
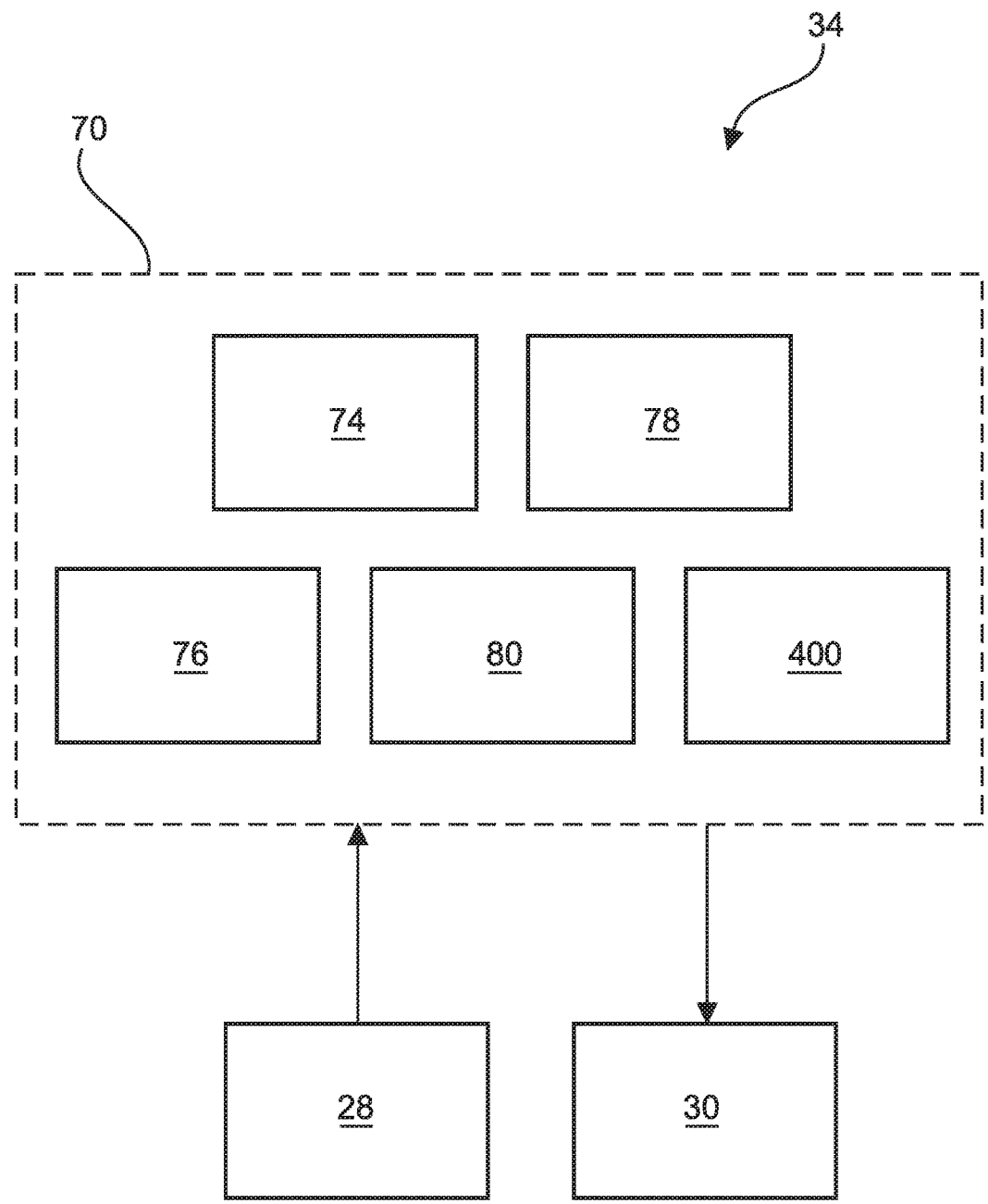
FIG. 3 is functional block diagram illustrating an autonomous driving system (ADS) having a corridor planning system associated with the vehicle of FIG. 1, in accordance with various embodiments.

In accordance with various embodiments, the controller 34 implements an autonomous driving system (ADS) as shown in FIG. 3. That is, suitable software and/or hardware components of the controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, and the like) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, as discussed above with regard to FIG. 1, one or more instructions of the controller 34 are embodied in the corridor planning system 100, for planning a corridor for the vehicle 10 to travel along a roadway. All or parts of the corridor planning system 100 may be embodied in the computer vision system 74, and/or the vehicle control system 80 or may be implemented as a separate system (referred to as a corridor planning system 400), as shown.

Figure 4:
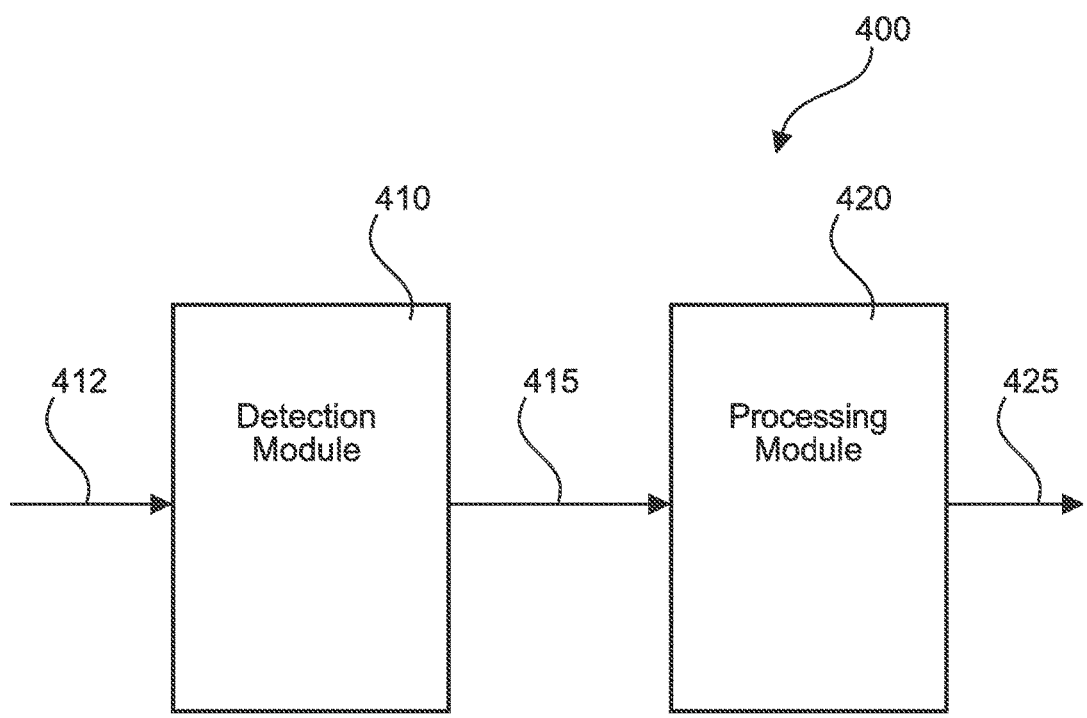
FIG. 4 is a functional block diagram illustrating the corridor planning system, in accordance with various embodiments.

Referring to FIG. 4 and with continued reference to FIG. 1, the corridor planning system 400 generally includes a detection module 410 and a processing module 420. In various embodiments, the detection module 410 and the processing module 420 are disposed onboard the vehicle 10. As can be appreciated, in various embodiments, parts of the corridor planning system 400 may be disposed on a system remote from the vehicle 10 while other parts of the corridor planning system 400 may be disposed on the vehicle 10.

In various embodiments, the detection module 410 receives sensor data 412 from various sensors 40*a*-40*n* of the vehicle 10 (e.g., lidar sensors, radar sensors, cameras, and so on). The detection module 410 gathers the sensor data 412 in order to obtain information pertaining to a roadway on which the vehicle 10 is travelling, including target vehicles in proximity to the vehicle 10, including other vehicles that may be parked along the roadway as well as other vehicles representing oncoming traffic, as well as any other detected objects (e.g., trees, walls, rocks, and so on). In various embodiments, the sensor data 412 is obtained via the sensors 40*a*-40*n* of FIG. 1. In various embodiments, the sensor data 412 may include, among other data, a position for each of the detected vehicles (or other objects) as well as information as to whether the target vehicle is moving, and, if so, a direction and magnitude of the movement, among other possible information. In various embodiments, the detection module 410 gathers this information and generates observational data 415 as outputs for the detection module 410, which are provided to the processing module 420 described below.

The processing module 420 receives the observational data 415 from the detection module 410, performs analysis using the received observational data 415 (e.g., as to a curvature of the roadway as well as predicted future positions and movement of the detected target vehicles), and generates instructions 425 as appropriate for operation of the vehicle 10 in respect to the analysis. For example, in various embodiments, the processing module 420 selects a corridor for the vehicle 10 to travel along the roadway, based on the analysis of the observational data 415. Also in various embodiments, the processing module 420 generates instructions 425 for operation of the vehicle 10 along the selected corridor (e.g., for implementation via an automatic driving system, such as the ADS 70 of FIG. 3, and/or components thereof, and/or vehicle actuators, such as the actuators 42*a* . . . 42*n* of FIG. 1).

Figure 5:
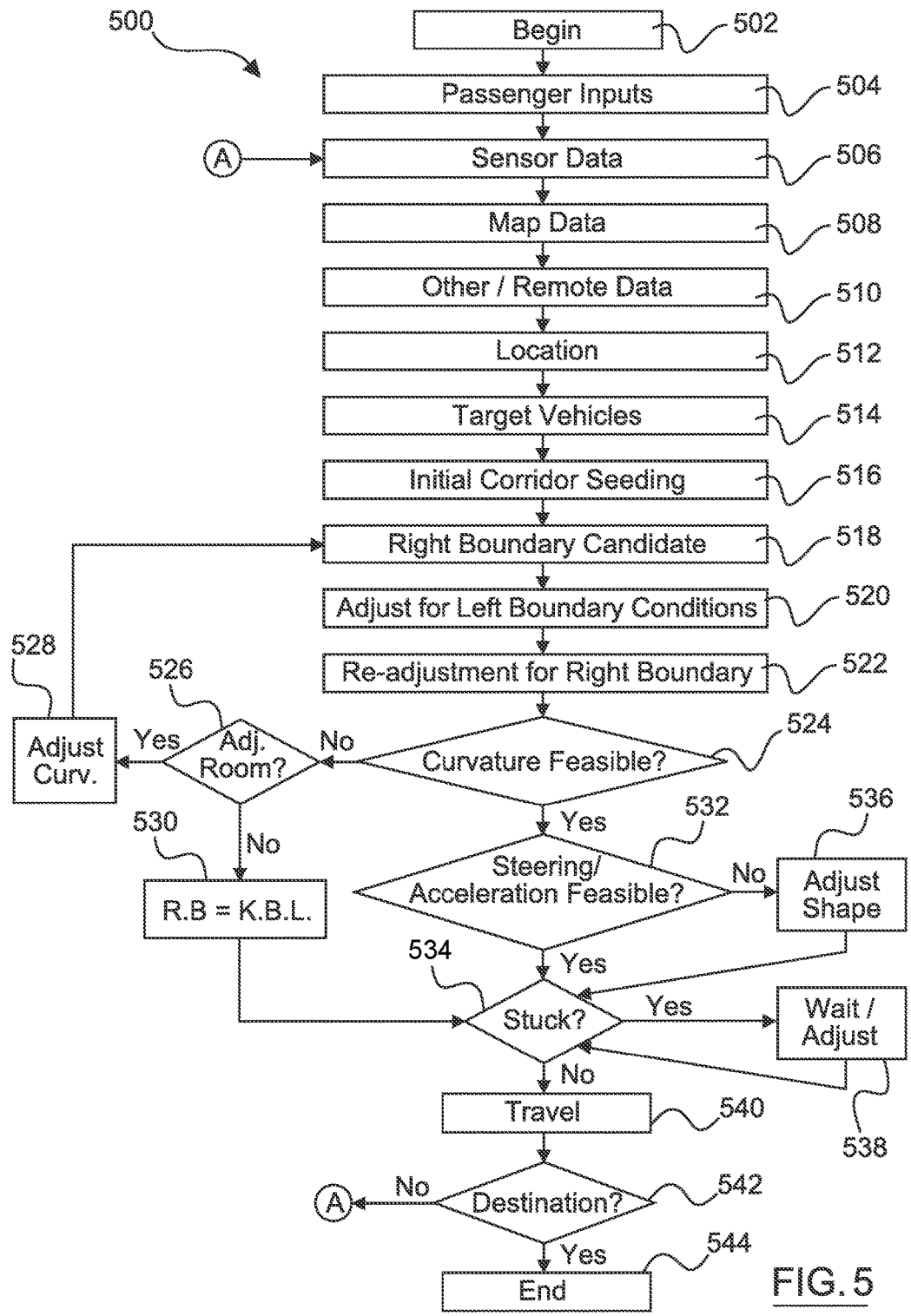
FIG. 5 is a flowchart for a control process for planning a corridor of travel for a vehicle, in accordance with various embodiments.

With reference to FIG. 5, a flowchart is provided for a control process 500 for planning a corridor for the vehicle 10 to travel along a roadway. In accordance with various embodiments, the control process 500 can be implemented in connection with the corridor planning system 100 and vehicle 10 of FIG. 1, the transportation system 52 of FIG. 2, the autonomous driving system of FIG. 3, and the corridor planning system 400 of FIG. 4.

As can be appreciated in light of the disclosure, the order of operation within the control process 500 is not limited to the sequential execution as illustrated in FIG. 5, but may be performed in one or more varying orders as applicable and in accordance with the present disclosure. In various embodiments, the control process 500 can be scheduled to run based on one or more predetermined events, and/or can run continuously during operation of the vehicle 10.

Figure 6:
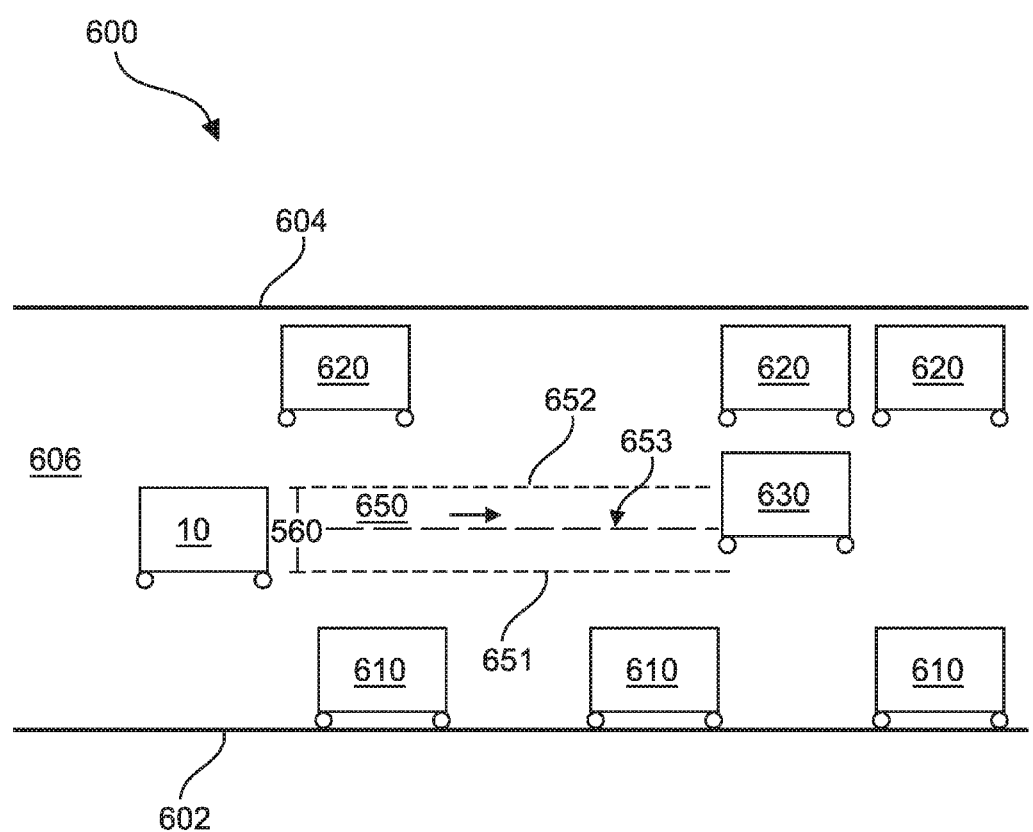
FIGS. 6-9 are schematic diagrams of the vehicle of FIG. 1 on a roadway shared with other vehicles, through which a corridor for travel is planned, in accordance with exemplary embodiments.

The process 500 of FIG. 5 will also be discussed further below with reference to FIGS. 6-9, which provide schematic diagrams of the autonomous vehicle 10 in a particular environment in accordance with various embodiments. As depicted in FIG. 6, in various embodiments the vehicle 10 is operating during a current vehicle ride along a roadway 600 (the vehicle 10 is depicted as travelling from right to left for illustrative purposes). In certain examples, the roadway 600 includes a right boundary 602, a left boundary 604, and a road surface 606 therebetween. In various embodiments, there are no lane markings within the road surface 606. Also in various embodiments, the driving region 606 is shared by vehicles travelling in both directions (right to left, and left to right), as well as other vehicles that may be parked on both sides of the road surface 606. Specifically, as depicted in certain embodiments, certain vehicles 610 are parked proximate the right boundary 602, certain other vehicles 620 are parked proximate the left boundary 604, and one or more additional vehicles 630 are travelling in an opposite direction of the vehicle 10, toward the vehicle 10.

With reference back to FIG. 5, in various embodiments the control process 500 may begin at 502. In various embodiments, process step 502 occurs when an occupant is within the vehicle 10 and the vehicle 10 begins operation in an automated or non-automated manner.

Passenger inputs are obtained at 504. In various embodiments, the passenger inputs pertain to a desired destination for travel via the vehicle 10. In various embodiments, the user inputs may be obtained via an input device of the vehicle (e.g., corresponding to the input device 27 of FIG. 1) and/or a passenger device (e.g., the user device 54 of FIG. 2). Also in certain embodiments, the passenger inputs are obtained via the detection module 410 of FIG. 4.

Sensor data is obtained at 506. In various embodiments, sensor data is obtained from the various sensors 40*a* . . . 40*n* of FIG. 1. For example, in various embodiments, sensor data is obtained from cameras and/or other visions systems, lidar sensors, radar sensors, and/or one or more other sensors 40*a* . . . 40*n* of FIG. 1. Also in various embodiments, the sensor data may pertain to data observations pertaining to surroundings for the vehicle 10 as it travels along a roadway (e.g., roadway 600 of FIGS. 6-9), including information as to the roadway 600 itself (e.g., its width, length, curvature, and so on) as well as other vehicles and other objects that are also utilizing the roadway 600 (e.g. parked vehicles 610, 620 of FIGS. 6-9 as well as any other vehicles 630 of oncoming traffic). Also in certain embodiments, the sensor data of 606 is obtained via the detection module 410 of FIG. 4 as sensor data 412 of FIG. 4, and corresponding outputs are provided as observational data 415 to the processing module 420 for processing.

Map data is obtained at 508. In various embodiments, map data is retrieved from a memory, such as the data storage devices 32 and/or 46 of FIG. 1, onboard the vehicle 10. In certain embodiments, the map data may be retrieved from the route database 53 of the autonomous vehicle based remote transportation system 52 of FIG. 2. Also in various embodiments, the map data comprises maps and associated data pertaining to the roadway 600 of FIGS. 6-9 on which the vehicle 10 is traveling. Also in certain embodiments, the map data is obtained via the detection module 410 of FIG. 4.

In various embodiments, other data is obtained at 510. In various embodiments, the other data is obtained at 610 via the communication system 36 of FIG. 1 (e.g., from a transceiver thereof) from or utilizing one or more remote data sources. By way of example, in certain embodiments, the other data of 510 may include GPS data using one or more GPS satellites, including the present location of the vehicle 10; data regarding applicable traffic flows and patterns for the roadway; data regarding previous corridors selected for the roadway (e.g., for the vehicle 10 and/or for one or more other vehicles), traffic light histories, histories of movement of nearby stationary vehicles, and/or weather, construction, and/or other data from one or more remote sources that may have an impact on the analysis of the roadway.

A current location of the vehicle is determined at 512. In various embodiments, the current location is determined by the processing module 420 of FIG. 4 (e.g., using processor 44 of FIG. 1) using information obtained from 504, 506, 508 and/or 510. For example, in certain embodiments, the current location is determined using a GPS and/or other location system, and/or is received from such system. In certain other embodiments, the location may be determined using other sensor data from the vehicle and/or via inputs provided by a user or passenger of the vehicle 10.

Identifications are made at 514 as to other vehicles that are sharing the roadway with the vehicle 10. In various embodiments, the processor 44 of FIG. 1 identifies other vehicles (e.g., other vehicles 610, 620, and 630 of FIGS. 6-9) that are parked along the roadway 600 and/or that are travelling along the roadway (e.g., including oncoming traffic). In various other embodiments, other objects (e.g., trees, rocks, walls, and so on) may also be detected. In various embodiments, the identifications of 514 are made by the processing module 420 of FIG. 4 (e.g., via the processor 44 of FIG. 1) using the observational data 415 from the detection module 410 from 506.

An initial corridor seeding is generated at 516. In various embodiments, the initial seeding of 516 includes a rough, first approximation of the corridor of travel for the vehicle 10 through the roadway. In certain embodiments, the initial seeding is generated based on the physical characteristics of the roadway, including its width, shape, and curvature, without consideration (initially) of other vehicles sharing the roadway.

With reference to FIG. 6, an exemplary initial corridor seeding 650 is depicted. In various embodiments, the initial seeding is generated by the processing module 420 of FIG. 4 (e.g., via the processor 44 of FIG. 1) using the observational data 415 from the detection module 410. As depicted in various embodiments, the initial corridor seeding 650 includes a right edge 651 and a left edge 652 that define the initial corridor seeding 650, and a width 660 of the initial corridor seeding 650 that extends between the right and left edges 651, 652.

In various embodiments, the initial seeding is generated such that initial seeding is substantially parallel to a center of the roadway along the intended direction of travel. In certain examples, the initial seeding includes the center of the roadway. For example, in certain embodiments, a geometric lane center (e.g., center 653, as depicted in FIG. 6) is determined that divides the road/lane in half. In certain embodiments, the geometric lane center is then used as the seeding position of the left boundary of the corridor. The seeding position of the right boundary is then determined by offsetting the left boundary to the right for a certain amount of distance in certain embodiments. Also in certain embodiments, a region surrounding the center (equidistant on both sides from the center) equal to and somewhat larger than the width of the autonomous vehicle (for a comfort or safety zone) is then used as the initial seeding 650 of the driving corridor.

In certain other embodiments, the initial seeding is parallel to the center of the roadway, but also includes a predetermined offset (e.g., to the right, for regions in which vehicles are expected to drive on the right side of the roadway). In certain embodiments, the offset is equal to a predetermined buffer distance from the center of the roadway.

Also in various embodiments, the initial seeding of the corridor uses heuristics and filtering with respect to the current position of the vehicle 10, for example as determined at 512. Accordingly, in various embodiments, the initial seeding of the corridor is generated substantially parallel to the center of the roadway, with consideration of the current position of the vehicle 10 (e.g., via the heuristics and filtering, so as to avoid unnecessary and/or excessive movement of the vehicle 10, and so on).

Also in various embodiments, the initial seeding of the driving corridor extends initially straight along the road, following the contour of the road. For example, in various embodiments, if the road curves, the initial seeding of the corridor will curve along the road, so as to remain in the center of the road).

A right boundary candidate is selected for the corridor at 518. In various embodiments, the right boundary candidate is selected as a right hand boundary for an adjusted corridor (e.g., updated from the initial seeding corridor of 516), based on any parked vehicles on the right side of the road. In various embodiments, the adjustments to the corridor are generated by the processing module 420 of FIG. 4 (e.g., via the processor 44 of FIG. 1) using the observational data 415 from the detection module 410.

With reference to FIG. 7-1, an exemplary adjusted corridor 750 is depicted that accounts for other vehicles 610 that are parked on the right side of the roadway (e.g., near the right boundary 602). Specifically, in various embodiments, a parking grid 770 is generated with respect to the parked vehicles 610 on the right side of the roadway 600. In certain embodiments, the parking grid 770 covers all of the parked vehicles 610 on the right side of the roadway 600. In various embodiments, the parked occupancy grid includes parked vehicles, non-drivable areas and any unidentified non-moving objects.

In various embodiments, the initial seeding of 516 is adjusted based on the parking grid 770 in order to generate the adjusted corridor 750. For example, in certain embodiments as depicted in FIG. 7-1, a right boundary candidate 751 for the adjusted corridor 750 is determined based on a buffer distance 755 from a closest point or segment of the parking grid 770. In certain embodiments, the buffer distance is between one half meter and one meter; however, this may vary in different embodiments. Also in various embodiments, the initial corridor seeding 650 of FIG. 6 (i.e., from step 516) is shifted to the left to include the right boundary candidate 751 as a new rightmost edge of the adjusted corridor 750, to accommodate the parked vehicles 610. For example, in certain embodiments, if other vehicles are parked to the right side of the ride within the initial guess of the driving corridor (or within a predetermined distance of the driving corridor), then the corridor is updated with a shift to the left, and so on. In various embodiments, the adjusted corridor 750 of FIG. 7-1 maintains the same width as the initial corridor seeding 650 of FIG. 6. For example, in certain embodiments, the initial corridor effectively shifts such that the right boundary candidate serves as the right edge 751 of the adjusted corridor 750, and the left edge 752 of the adjusted corridor 750 is a distance from the right edge 752 equal to the initial width of the corridor (i.e., the width 760 of the adjusted corridor 750 being equal to the width 660 of the initial corridor seeding 650).

With reference to FIG. 7-2, a slightly modified illustration is provided for the corridor 750 of FIG. 7-1, in accordance with exemplary embodiments. In the example of FIG. 7-2, a parked vehicle 640 is protruding further than the other parked vehicles 610 into the roadway. Accordingly, in various embodiments, in this example of FIG. 7-2, the right boundary 751 of the corridor 750 is pushed, or bent, to the left, due to the protruding parked vehicle 640 (e.g., to help ensure that the host vehicle 10 avoids the protruding parked vehicle 640).

In addition, for both FIGS. 7-1 and 7-2, while consideration is discussed with respect to other vehicles that are parked on the right side of the road, it will be appreciated that similar consideration (e.g., at step 518) may also be made for other objects, such as other stationary objects (e.g., trees, rocks, walls, and so on) that may be disposed on the right side of the roadway.

In various embodiments, the adjusted corridor continues to extend initially straight along the road, following the contour of the road. For example, in various embodiments, if the road curves, the adjusted corridor will curve along the road accordingly.

In addition, in certain embodiments, the curvature of the adjusted corridor is filtered forward and backward to help ensure that the right boundary is smooth. For example, in various embodiments, as the road curves, so will the right boundary. Also in various embodiments, the right boundary is selected among various different possible right boundaries such that the selected right boundary avoids all of the parked vehicles (i.e., remains to the left of each of the parked vehicles), while, under this constraint, attaining the smallest deviations in curvature from the road center itself. In addition, in certain embodiments, various potential travel paths are drawn (e.g., as respective arcs), and are then connected together in a manner that minimizes the deviations in curvature from the road center itself, while still maintaining a buffer between the vehicle 10 and the vehicles 610 parked on the right side of the roadway 600.

The corridor is adjusted further at 520 with consideration of left boundary conditions. In various embodiments, at 520 the corridor of 518 is adjusted further based on detected other vehicles (or other objects) on the left side of the road. In various embodiments, the corridor is adjusted further based on any other vehicles representing oncoming traffic and, if applicable, also based on vehicles that may be parked on the left side of the road. In various embodiments, the further adjustments to the corridor are generated by the processing module 420 of FIG. 4 (e.g., via the processor 44 of FIG. 1) using the observational data 415 from the detection module 410.

Figure 8:
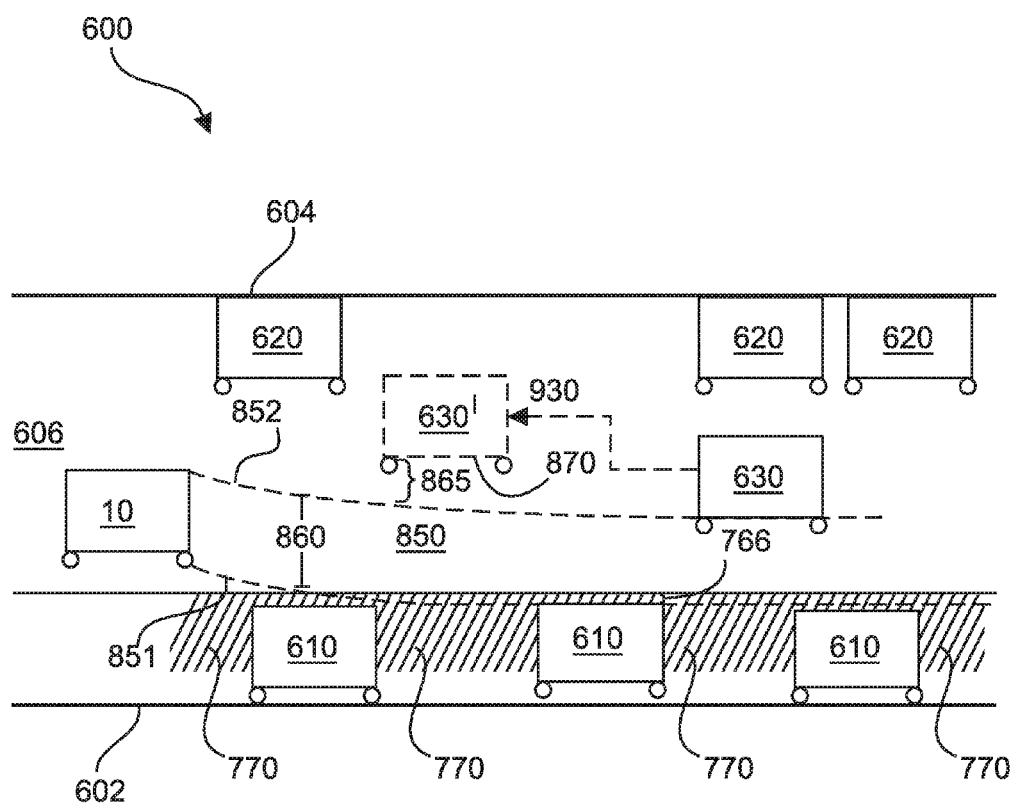

With reference to FIG. 8, an exemplary further adjusted corridor 850 is depicted that accounts for other vehicles 620, 630 on the left side of the road way, including other vehicles 620 parked near the left boundary 604 as well as any vehicles 630 that may represent oncoming traffic. For example, in various embodiments, if other vehicles 620 are parked to the left side of the road within the initial guess of the driving corridor (or within a predetermined threshold of the driving corridor), then the corridor may be updated with a shift to the right (e.g., because parked vehicles 620 may cause oncoming vehicle 630 to encroach on the corridor for the vehicle 10, thereby causing the vehicle 10 to adjust the corridor to the right), and so on.

In addition, with respect to potential oncoming vehicles, in various embodiments an examination is made as to the position of the oncoming vehicle, and a prediction is made as to how the oncoming vehicle will move in the future. For example, with reference to FIG. 8, a predicted path 930 is generated with respect to oncoming vehicle 630, for example in which the oncoming vehicle 630 first moves around certain parked vehicles 620 and then moves to the side of the roadway to make room for the vehicle 10 to pass. Also as depicted in FIG. 8, the predicted path includes a new location 630' for the vehicle 630 at a subsequent point in time in the near future (e.g., corresponding to a point in time in which the vehicle 10 may be alongside the oncoming vehicle 630). In certain embodiments, the predicted path is generated based on the target vehicle 630's current position and velocity as well as the presence or absence of other parked vehicles 620 on that side of the roadway, including an amount of available space for the target vehicle 630 to move to the side in order to allow the host vehicle 10 to pass, and so on.

In various embodiments, the further adjusted corridor 850 includes a left boundary 852 that maintains a sufficient buffer 865 from the oncoming vehicles 630 (and, that would similarly maintain a buffer of at least this size from the parked vehicles 620 on the left side of the road). In one embodiment, the buffer 865 is the same magnitude as the buffer 755 of FIG. 7-1 for the right side, at least for a starting point. If necessary, one or both of the buffers 755, 855 may subsequently be reduced, for example if an adequate corridor is not feasible using the original buffers 755, 855.

In addition, with further reference to FIG. 8, in various embodiments the further adjusted corridor 850 also includes a right boundary 851 that is spaced apart from the left boundary 852 by the width 860 of the further adjusted corridor 850. In various embodiments, the width 860 of the adjusted corridor 850 of FIG. 8 is the same magnitude as the width 760 of the adjusted corridor 750 of FIG. 7-1 and the width 660 of the initial corridor seeding 650 of FIG. 6, at least for a starting point. If necessary, the width may subsequently be reduced, for example if an adequate corridor is not feasible using the original width.

In various embodiments, a first, or top, priority is to ensure than oncoming vehicles 630 do not come into contact with the host vehicle 10. Accordingly, in certain embodiments, the further adjusted corridor 850 is maintained such that the left saturation (e.g., an endpoint 870 of the oncoming vehicle 630 that is closest to the host vehicle 10, or a line segment drawn at the endpoint 870) is outside the further adjusted corridor 850, so that the oncoming vehicle 630 will not contact the host vehicle 10. If necessary to accomplish this top priority, the width 860 of the further adjusted corridor 850 is reduced accordingly, provided that the width 860 must be at least as wide as the width of the vehicle 10 itself plus a buffer, in various embodiments.

In various embodiments, the further adjusted corridor 850 continues to extend initially straight along the road, following the contour of the road. For example, in various embodiments, if the road curves, the adjusted corridor will curve along the road accordingly.

In addition, in certain embodiments, the curvature of the further adjusted corridor is filtered forward and backward to help ensure that the left boundary is smooth. For example, in various embodiments, as the road curves, so will the left boundary. Also in various embodiments, the left boundary is selected among various different possible left boundaries such that the left boundary avoids the oncoming traffic and any vehicles parked on the left side of the road, while, under this constraint, attaining the smallest deviations in curvature from the road center itself. In addition, in certain embodiments, various potential travel paths (e.g., arcs) are drawn (e.g., an arc drawn representing movement of the vehicle 10 along each possible travel path consistent with the constraint, in certain embodiments) and are then connected together in a manner that minimizes the deviations in curvature from the road center itself, while still maintaining a buffer between the vehicle 10 and the vehicles 620, 630 on the left side of the roadway 600.

Figure 9:
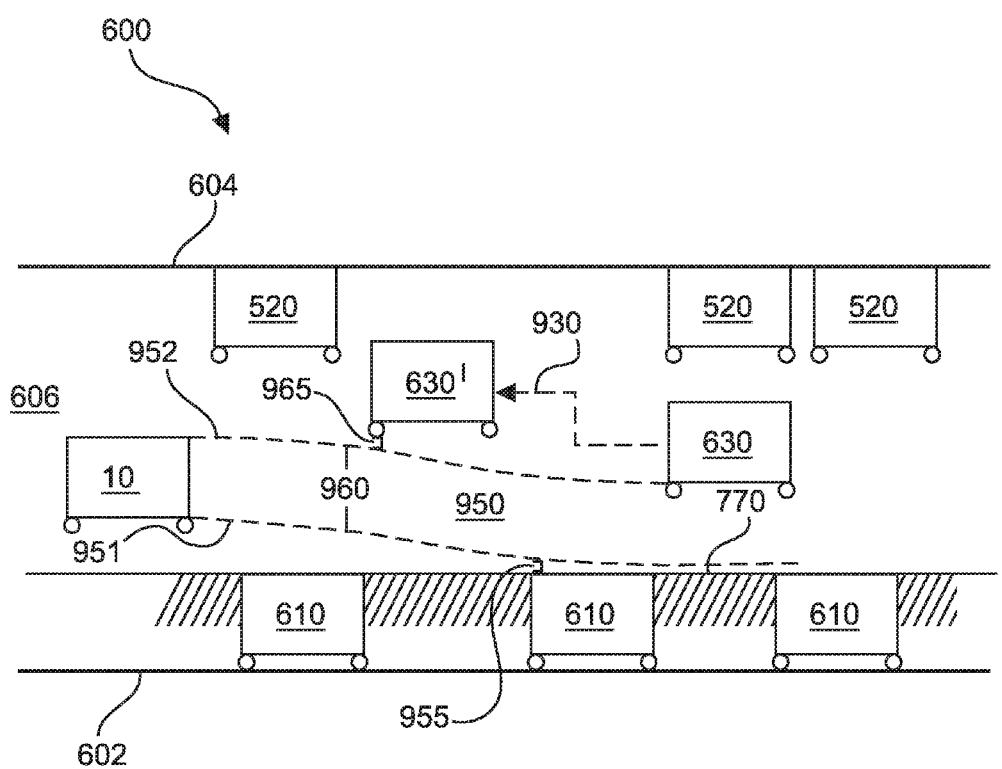

In various embodiments, further consideration of the parking grid and parked vehicles on the right side of the ride is undertaken at 522. With reference to FIGS. 8 and 9, in various embodiments a check is performed as to whether the further adjusted corridor 850 intersects with the parking grid 770. For example, in FIG. 8, a region of intersection 766 is denoted for a region in which the further adjusted corridor 850 intersects the parking grid 770, which could thereby indicate potential contact between the vehicle 10 and one of the parked vehicles 610. As a result, in various embodiments, the corridor 850 is further updated again, with a shift to the left, thereby resulting in a final corridor 950 as depicted in FIG. 9.

In various embodiments, the final corridor 950 avoids contact with all of the vehicles 520, 610, 630, if possible, while then also maintaining the width of the corridor and applicable buffers to the extent possible given these constraints. If necessary, the width and buffers of the final corridor 950 are reduced to avoid contact in various embodiments. For example, with reference to FIG. 9, (i) the left boundary 952 avoids contact with the vehicles 520, 630 on the left; (ii) the right boundary 951 avoids contact with the parked vehicles 610; and (ii) the width 960, left buffer 965, and right buffer 955 are reduced if necessary to attain primary objectives (i) and (ii) above (i.e., to avoid contact as a first priority).

Also in various embodiments, the curvature of the adjusted corridor is filtered forward and backward to help ensure that the boundaries are smooth, if possible (similar to the discussions above). For example, in certain embodiments, the corridor is further adjusted as appropriate in order to minimize steering adjustments, for example by minimizing the severity and/or frequency of turns (e.g., to avoid hairpin turns, zig zag patterns, and so on), and/or by meeting one or more other smoothness criteria by utilizing one or more filtering techniques (and/or by adjusting the boundaries of the corridor) while meeting the constraints (e.g., in certain embodiments, different possible adjustments may be proposed, and an adjustment that obtains the smoothest path while meeting the constraints may be selected, and so on). However, to the extent necessary to avoid contact with the other vehicles 610, 620, and 630, the smoothness of the final corridor 950 may be sacrificed as necessary to attain the primary objectives of avoiding contact with the other vehicles (e.g., the final corridor 950 may be less smooth, and for example may include more turns and/or sharper turns, and so on, if necessary to avoid contact with the other vehicles).

With reference back to FIG. 5, checks are performed at 524 as to whether the final corridor 950 is feasible with respect to operation of the vehicle 10. In various embodiments, the feasibility checks are generated by the processing module 420 of FIG. 4 (e.g., via the processor 44 of FIG. 1).

Specifically, in various embodiments, the feasibility checks include an analysis of the current position of the vehicle 10, and whether the vehicle 10 can successfully operate through the final corridor 950 given the current position of the vehicle 10, the amount of curvature required of the final corridor 950, and whether the vehicle 10 can make turns tight enough as required to operate through the final corridor 950. In addition, in certain embodiments, the feasibility checks include a curvature constraint as to how much the curvature of the corridor can deviate from the curvature of the road (e.g., to make sure that the vehicle 10 is not being requested to make too tight of a turn).

If it is determined that the curvature of the final corridor 950 is not feasible, then in various embodiments it is determined at 526 whether the curvature constraint can be tightened further. In various embodiments, this determination is made by the processing module 420 of FIG. 4 (e.g., via the processor 44 of FIG. 1).

If it is determined that the curvature constraint can be tightened further, then the curvature constraint is incrementally tightened at 528. In various embodiments, this is performed by the processing module 420 of FIG. 4 (e.g., via the processor 44 of FIG. 1). The process then returns to the above-referenced step 518, and the process continues in a new iteration, beginning with step 518, with the tightened curvature constraint.

Conversely, if it is determined that the curvature constraint cannot be tightened further, then the process proceeds to 530. In various embodiments, at 530, the right boundary is set equal to the curvature constraint, and the process then proceeds to 534, discussed further below.

With reference back to step 524, if it is determined that the curvature of the final corridor is feasible, then a determination is made at 532 as to whether the final corridor is feasible with respect to a steering acceleration of the vehicle 10. In various embodiments, these feasibility checks are also generated by the processing module 420 of FIG. 4 (e.g., via the processor 44 of FIG. 1).

Specifically, in various embodiments, the feasibility checks of 532 include an analysis of whether the rate of curvature over time of the final corridor 950 can be accomplished by the vehicle 10 through the duration of the final corridor 950 in view of the steering wheel acceleration limits and/or the maximum radius of curvature of the vehicle 10. In addition, in certain embodiments, the feasibility checks of 532 also take into account the current vehicle position and relative heading of the vehicle 10, including considerations for the curvature and lateral acceleration constraint for the vehicle 10, as well as considerations for whether the vehicle 10 will be able to keep inside the generated corridor.

If it is determined at 532 that the final corridor 950 is feasible with respect to the steering acceleration of the vehicle 10, then the process proceeds to step 534, described further below.

Conversely, if it is determined at 532 that the final corridor 950 is not feasible with respect to the steering acceleration of the vehicle 10, then the shape of the final corridor 950 is adjusted further at 536 to accommodate the steering acceleration constraints of the vehicle 10. For example, in certain embodiments, the boundaries of the corridor are saturated with shapes that satisfy the steering acceleration feasibility constraints. For example, in certain embodiments, the process takes the absolute limits of how fast the vehicle 10 can turn, and then uses these absolute limits in customizing the shape of the corridor accordingly.

Accordingly, in various embodiments, the processor first attempts to make the corridor as smooth as possible. Then the corridor will be made less and less smooth as necessary. In various embodiments, if the corridor is not smooth but is still against the limits of the vehicle 10 (e.g., the steering wheel cannot turn any faster, and/or the vehicle 10 cannot turn any tighter), then the corridor is left in its current state. In addition, in various embodiments, if the corridor is not feasible, then the closest feasible corridor is selected, and so on.

Also in various embodiments, if the generated corridor is still not feasible after all the possible adjustments mentioned previously, then the corresponding side of the corridor will be expanded to the tightest feasible shape and position.

In various embodiments, these adjustments are performed by the processing module 420 of FIG. 4 (e.g., via the processor 44 of FIG. 1). The process then proceeds to step 534, described directly below.

A determination is made at 534 as to whether the vehicle 10 is stuck. In various embodiments, the vehicle 10 may be considered to be stuck if a feasible corridor is not attainable that would enable the vehicle 10 to successfully navigate the roadway 600 of FIGS. 6-9 without contacting any of the vehicles 610, 620, and 630 (and/or other objects along the roadway). In various embodiments, this determination is made by the processing module 420 of FIG. 4 (e.g., via the processor 44 of FIG. 1).

If it is determined at 534 that the vehicle 10 is stuck, then one or more adjustments are provided at 538. For example, in certain embodiments, the process may determine whether a path planner may have a solution for moving around the other vehicle or object (e.g., by stopping and/or slowing down significantly and waiting for a vehicle to pass, by making a three point turn, by reversing for a short distance, and/or via one or more other techniques). In various embodiments, these adjustments may be made via instructions provided by the processing module 420 of FIG. 4 (e.g., via the processor 44 of FIG. 1) to one or more other vehicle modules, such as those that are part of an automatic driving system (such as the ADS 70 of FIG. 3, and/or components thereof, and/or vehicle actuators, such as the steering system 24, brake system 26, and/or actuators 42a . . . 42n of FIG. 1).

Once it is determined in an iteration of 534 that the vehicle 10 is not stuck, then the vehicle 10 travels along the latest adjusted corridor at 540. For example, in various embodiments, the vehicle 10 travels along the selected path through the roadway. Also in various embodiments, the continued travel is directed by the processing module 420 of FIG. 4 (e.g., via a processor 44 of FIG. 1), and is implemented via instructions 425 of FIG. 4 that are executed via an automatic driving system (such as the ADS 70 of FIG. 3, and/or components thereof and/or other components of the vehicle 10, such as the steering system 24, brake system 26, and/or actuators 42a . . . 42n of FIG. 1).

In various embodiments, as the vehicle 10 continues to travel, determinations are made at various iterations of 542 as to whether vehicle 10 has reached its destination. For example, in various embodiments, the processing module 420 of FIG. 4 (e.g., using a processor 44 of FIG. 4, and based on data provided by a navigation system of the vehicle 10) whether the vehicle 10 has reached a destination that was previously inputted or requested by an occupant of the vehicle 10.

In various embodiments, if the vehicle 10 has not reached its destination, then the process returns to 506, as the vehicle 10 continues to travel. In various embodiments, the process then repeats, beginning with 506, as additional sensor data is collected, along with the successive steps of the control process 500, until the vehicle 10 has reached its destination. Also in various embodiments, once the vehicle 10 has reached its destination, the process terminates at 544.

In various embodiments, the disclosed methods and systems provide for planning a corridor for the vehicle 10 to travel along a roadway that is shared with other vehicles. For example, in various embodiments, an initial corridor is selected based on the roadway and a current position of the vehicle, and the corridor is adjusted based on other vehicles that are parked along the roadway as well as based on oncoming traffic.

In accordance with various embodiments, certain steps of the process 500 discussed above may apply particularly in regions in which vehicles are expected to drive on the right side of the road. For example, after the initial seeding, the right boundary candidate is selected at 518, adjustments for left boundary conditions are made at 520, and re-adjustments for the right boundary are made at 522 in various embodiments. In certain embodiments, the vehicle 10 will then travel within the boundaries in a manner that further maximizes smoothness (e.g., in certain embodiments, the vehicle 10 may travel within or near the center of the boundaries when feasible, but may also deviate somewhat from an exact center of the boundaries when appropriate to minimize steering adjustments so long as the vehicle 10 is still reasonably within or near the center range of the left and right boundaries, and so on).

It will be appreciated that, in various embodiments in regions in which vehicles are expected to drive on the left side of the road, then the directions of such steps may be reversed. For example, in certain embodiments in regions in which vehicles are expected to drive on the left side of the road, after the initial seeding, the left boundary candidate may be selected at 518, adjustments for right boundary conditions may be made at 520, and re-adjustments for the left boundary may be made at 522 in various embodiments.

In addition, in various embodiments, the steps of the process 500 may also be implemented in various other roadway scenarios. By way of example, in roadways having multiple lanes of traffic moving in the same direction, in various embodiments the steps of the process 500 may be utilized with respect to avoiding any parked vehicles on the right hand side (e.g., in regions in which vehicles are expected to drive on the right side of the ride), with certain appropriate modifications as necessary, for example by treating a left lane marker as a fixed left boundary for the corridor, and so on.

Also in various embodiments, per the discussions above, the process 500 may generate the selected corridor for travel for the vehicle 10 based upon not only detected vehicles but also other detected objects, for example including other types of stationary objects such as trees, rocks, walls, and the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating a corridor of travel for a vehicle along a roadway, the method comprising:
   identifying a current position of the vehicle, using sensor data;
   generating, via a processor, an initial corridor seeding based upon the current position of the vehicle and physical characteristics of the road, without consideration of any other objects on the roadway, such that the initial corridor seeding is substantially parallel to a center of a lane of the roadway in which the vehicle is travelling and such that the initial corridor seeding has a corridor width that includes an initial offset that is larger than a vehicle width of the vehicle;
   identifying a first plurality of objects along a first side of the roadway, the first side comprising a side of the roadway in which the vehicle is traveling, using the sensor data;
   generating, via the processor, a target first boundary for the corridor based on the identified first plurality of objects along the first side of the roadway, the target first boundary generated to include a first initial buffer between the vehicle and the first plurality of objects, while minimizing a difference between a curvature of the corridor and a curvature of the roadway;
   adjusting, via the processor, the initial corridor seeding by shifting the initial corridor seeding in a direction opposite the first side of the roadway, generating a first adjusted corridor seeding having the same corridor width as the initial corridor seeding;
   identifying one or more second objects moving along a second side of the roadway, opposite the first side of the roadway, using the sensor data;
   generating, via the processor, a target second boundary on the second side of the roadway, opposite the first side, the target second boundary generated to include a second initial buffer between the vehicle and the one or more second objects, while minimizing the difference between the curvature of the corridor and the curvature of the roadway; and
   adjusting, via the processor, the first adjusted corridor seeding based on the target second boundary, by moving the first adjusted corridor seeding in a direction opposite the second side of the roadway, thereby generating the corridor of travel for the vehicle along the roadway.

2. The method of claim 1, wherein:
   the step of identifying the first plurality of objects comprises identifying a plurality of parked vehicles along the first side of the roadway, using the sensor data;
   the step of generating the target first boundary comprises generating the target first boundary for the corridor based on the parked vehicles along the first side of the roadway, including the first initial buffer between the vehicle and the parked vehicles, while minimizing the difference between a curvature of the corridor and a curvature of the roadway;
   the step of identifying the one or more second objects comprises identifying one or more oncoming vehicles moving along the second side of the roadway, using the sensor data; and
   the step of generating the target second boundary comprises generating the target second boundary based on the one or more oncoming vehicles, including the second initial buffer between the vehicle and the one or more oncoming vehicles, while minimizing the difference between the curvature of the corridor and the curvature of the roadway.

3. The method of claim 2, further comprising:
   performing a check as to whether the vehicle is expected to contact one of the parked vehicles, oncoming vehicles, or both; and
   adjusting the corridor width of the corridor as necessary to avoid the contact.

4. The method of claim 2, further comprising:
   performing a check as to whether the corridor satisfies a curvature feasibility constraint, a steering acceleration constraint, or both; and
   adjusting the corridor if the corridor does not satisfy the curvature feasibility constraint, the steering acceleration constraint, or both.

5. The method of claim 1, wherein the vehicle comprises an autonomous vehicle, and the method further comprises:
   automatically operating the autonomous vehicle along the corridor, via instructions provided by the processor.

6. The method of claim 1, wherein the step of adjusting the first adjusted corridor comprises:
   adjusting, via the processor, the first adjusted corridor seeding based on the target second boundary, by shifting the first adjusted corridor seeding in the direction opposite the second side of the roadway, thereby generating the corridor of travel for the vehicle along the roadway, wherein the corridor of travel has the same corridor width as the initial corridor seeding.

7. The method of claim 6, further comprising:
adjusting the first initial buffer and the second initial buffer, thereby resulting in the corridor of travel having a smaller corridor width than the initial corridor, as necessary to avoid contact with the first plurality of objects on the first side of the roadway and the one or more second objects on the second side of the roadway.

8. A system for generating a corridor of travel for a vehicle along a roadway, the system comprising:
a detection module configured to at least facilitate:
identifying a current position of the vehicle, using sensor data;
identifying a first plurality of objects along a first side of the roadway, the first side comprising a side of the roadway in which the vehicle is traveling, using the sensor data; and
identifying one or more second objects moving along a second side of the roadway, opposite the first side of the roadway, using the sensor data; and
a processing module coupled to the detection module and configured to at least facilitate:
generating, via a processor, an initial corridor seeding based upon the current position of the vehicle and physical characteristics of the road, without consideration of any other objects on the roadway, such that the initial corridor seeding is substantially parallel to a center of a lane of the roadway in which the vehicle is travelling and such that the initial corridor seeding has a corridor width that includes an initial offset that is larger than a vehicle width of the vehicle;
generating, via the processor, a target first boundary for the corridor based on the identified first plurality of objects along the first side of the roadway, the target first boundary generated to include a first initial buffer between the vehicle and the first plurality of objects, while minimizing a difference between a curvature of the corridor and a curvature of the roadway;
adjusting, via the processor, the initial corridor seeding by shifting the initial corridor seeding in a direction opposite the first side of the roadway, generating a first adjusted corridor seeding having the same corridor width as the initial corridor seeding;
generating, via the processor, a target second boundary on the second side of the roadway, opposite the first side, the target second boundary generated to include a second initial buffer between the vehicle and the one or more second objects, while minimizing the difference between the curvature of the corridor and the curvature of the roadway; and
adjusting, via the processor, the first adjusted corridor seeding based on the target second boundary, by moving the first adjusted corridor seeding in a direction opposite the second side of the roadway, thereby generating the corridor of travel for the vehicle along the roadway.

9. The system of claim 8, wherein:
the detection module is configured to at least facilitate:
identifying a plurality of parked vehicles along the first side of the roadway, using the sensor data; and
identifying one or more oncoming vehicles moving along the second side of the roadway, using the sensor data; and
the processing module is configured to at least facilitate:
generating the target first boundary for the corridor based on the parked vehicles along the first side of the roadway, including the first initial buffer between the vehicle and the parked vehicles, while minimizing a difference between the curvature of the corridor and the curvature of the roadway; and
generating the target second boundary based on the one or more oncoming vehicles, including the second initial buffer between the vehicle and the one or more oncoming vehicles, while minimizing the difference between the curvature of the corridor and the curvature of the roadway.

10. The system of claim 9, wherein the processing module is configured to at least facilitate:
performing a check as to whether the vehicle is expected to contact one of the parked vehicles, oncoming vehicles, or both; and
adjusting the corridor width of the corridor as necessary to avoid the contact.

11. The system of claim 9, wherein the processing module is configured to at least facilitate:
performing a check as to whether the corridor satisfies a curvature feasibility constraint, a steering acceleration constraint, or both; and
adjusting the corridor if the corridor does not satisfy the curvature feasibility constraint, the steering acceleration constraint, or both.

12. The system of claim 8, wherein the vehicle comprises an autonomous vehicle, and the processing module is configured to at least facilitate automatically operating the autonomous vehicle along the corridor, via instructions provided by the processor.

13. The system of claim 8, wherein the processing module is further configured to at least facilitate adjusting, via the processor, the first adjusted corridor seeding based on the target second boundary, by shifting the first adjusted corridor seeding in the direction opposite the second side of the roadway, thereby generating the corridor of travel for the vehicle along the roadway, wherein the corridor of travel has the same corridor width as the initial corridor seeding.

14. The system of claim 13, wherein the processing module is further configured to at least facilitate adjusting the first initial buffer and the second initial buffer, thereby resulting in the corridor of travel having a smaller corridor width than the initial corridor, as necessary to avoid contact with the first plurality of objects on the first side of the roadway and the one or more second objects on the second side of the roadway.

15. An autonomous vehicle comprising:
an autonomous drive system configured to operate the autonomous vehicle based on instructions that are based at least in part on a roadway in which the autonomous vehicle is traveling;
a plurality of sensors configured to obtain sensor data identifying:
a current position of the autonomous vehicle; and
a first plurality of objects along a first side of the roadway, the first side comprising a side of the roadway in which the autonomous vehicle is traveling; and
one or more second objects moving along a second side of the roadway, opposite the first side, using the sensor data; and
a processor coupled to the plurality of sensors and to the autonomous drive system, the processor configured to at least facilitate:
generating an initial corridor seeding based upon the current position of the autonomous vehicle and physical characteristics of the road, without consideration of any other objects on the roadway, such that the initial corridor seeding is substantially parallel to a center of a lane of the roadway in which the autonomous vehicle is travelling and such that the initial corridor seeding has a corridor width that includes an initial offset that is larger than a vehicle width of the autonomous vehicle;

generating a target first boundary for the corridor based on the identified first plurality of objects along the first side of the roadway, the target first boundary generated to include a first initial buffer between the autonomous vehicle and the first plurality of objects, while minimizing a difference between a curvature of the corridor and a curvature of the roadway;

adjusting the initial corridor seeding by shifting the initial corridor seeding in a direction opposite the first side of the roadway, generating a first adjusted corridor seeding having the same corridor width as the initial corridor seeding;

generating a target second boundary on the second side of the roadway, opposite the first side, the target second boundary generated to include a second initial buffer between the autonomous vehicle and the one or more second objects, while minimizing the difference between the curvature of the corridor and the curvature of the roadway;

adjusting the first adjusted corridor seeding based on the target second boundary, by moving the first adjusted corridor seeding in a direction opposite the second side of the roadway, thereby generating the corridor of travel for the autonomous vehicle along the roadway; and providing the instructions to the autonomous drive system to operate the autonomous vehicle along the corridor.

16. The autonomous vehicle of claim 15, wherein:
the plurality of sensors are configured to at least facilitate:
   identifying a plurality of parked vehicles along the first side of the roadway, using the sensor data; and
   identifying one or more oncoming vehicles moving along the second side of the roadway, using the sensor data; and
the processor is configured to at least facilitate:
   generating the target first boundary for the corridor based on the parked vehicles along the first side of the roadway, including the first initial buffer between the autonomous vehicle and the parked vehicles, while minimizing the difference between a curvature of the corridor and the curvature of the roadway; and
   generating the target second boundary based on the one or more oncoming vehicles, including the second initial buffer between the autonomous vehicle and the one or more oncoming vehicles, while minimizing the difference between the curvature of the corridor and the curvature of the roadway.

17. The autonomous vehicle of claim 16, wherein the processor is configured to at least facilitate:
   performing a check as to whether the autonomous vehicle is expected to contact one of the parked vehicles, oncoming vehicles, or both; and
   adjusting the corridor width of the corridor as necessary to avoid the contact.

18. The autonomous vehicle of claim 16, wherein the processor is configured to at least facilitate:
   performing a check as to whether the corridor satisfies a curvature feasibility constraint, a steering acceleration constraint, or both; and
   adjusting the corridor if the corridor does not satisfy the curvature feasibility constraint, the steering acceleration constraint, or both.

19. The autonomous vehicle of claim 15 wherein the processor is configured to at least facilitate adjusting the first adjusted corridor seeding based on the target second boundary, by shifting the first adjusted corridor seeding in the direction opposite the second side of the roadway, thereby generating the corridor of travel for the vehicle along the roadway, wherein the corridor of travel has the same corridor width as the initial corridor seeding.

20. The autonomous vehicle of claim 19, wherein the processor is further configured to at least facilitate adjusting the first initial buffer and the second initial buffer, thereby resulting in the corridor of travel having a smaller corridor width than the initial corridor, as necessary to avoid contact with the first plurality of objects on the first side of the roadway and the one or more second objects on the second side of the roadway.

* * * * *